Jan. 7, 1969 H. GLOCK 3,421,155
MAGNETIC STORE
Filed Sept. 29, 1965
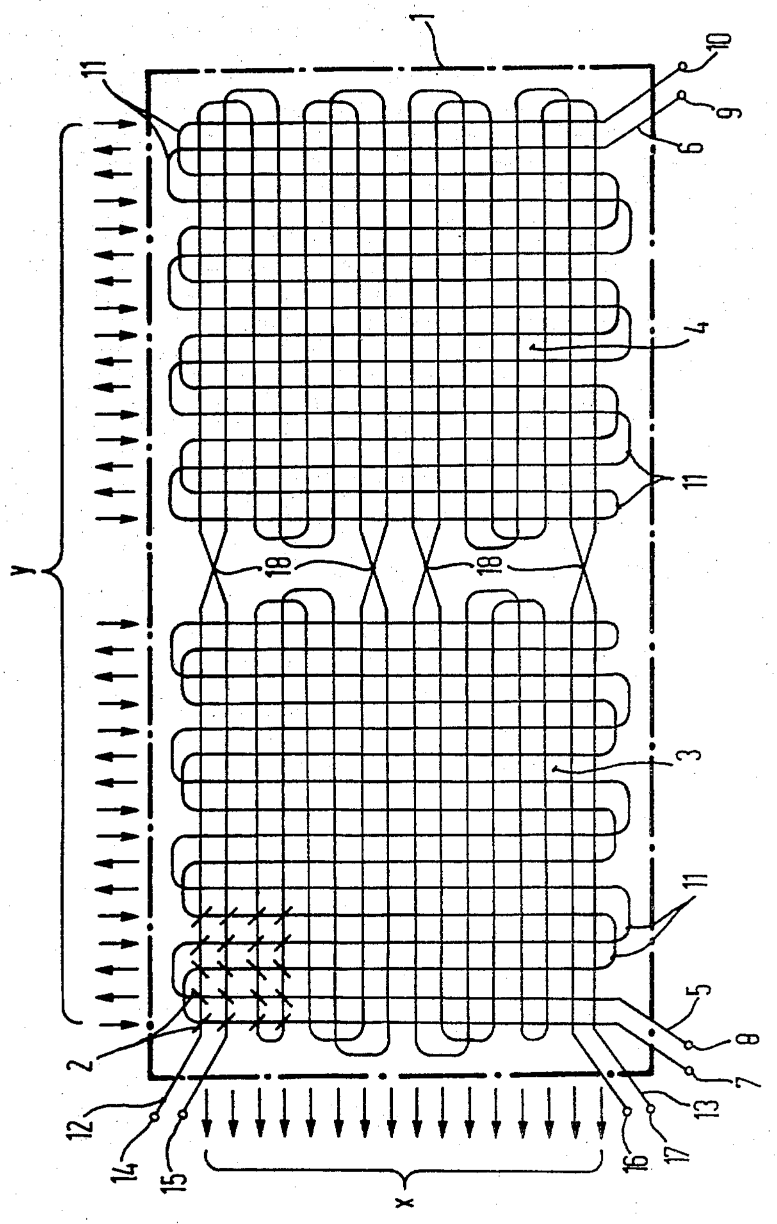
INVENTOR
Hans Glock
BY Stiee & Stiee
ATTYS.

United States Patent Office 3,421,155

Patented Jan. 7, 1969

3,421,155
MAGNETIC STORE

Hans Glock, Germering, Germany, assignor to Siemens Aktiengesellschaft, a corporation of Germany Filed Sept. 29, 1965, Ser. No. 491,083
Claims priority, application Germany, Sept. 30, 1964, S 93,509
U.S. Cl. 340—174 4 Claims
Int. Cl. G11b *5/00*

The invention relates to a magnetic store operating accordance to the coincidence principle. Such a store consists generally of individual magnetic planes arranged spatially one behind the other, which are capable, under identical addresses, in each case to store an information unit of a word. This type of store is constructed, as a rule, as a magnetic core store; but theoretically, the thin magnetic layers which have recently been gaining in importance can also be used for such a storage area in connection with the principles of the present invention.

A large number of individual storage cells, for example, magnetic ring cores, are arranged in storage or matrix planes. These storage cells are arranged in rows and columns, and are magnetically connected with at least, in each case, a row conductor and a column conductor, and a control conductor which serves as the address selection, as well as an inhibit conductor, and also as a sense conductor. The switching takes place in magnetic core stores by means of the fact that all of these conductors are connected through the aperture of each core only once. While the address selection takes place in each of the storage planes under the control of an $x$- and of a $y$-conductor, the information which is to be written into the selected storage cell of each plane is determined by the inhibit current flowing or not flowing over the inhibit conductor or conductors of the storage plane in question. As is well known, in the reading as in the writing of information into the storage arrangement under consideration, a current flows which has half the magnitude of that which is necessary for the "flipping" of a storage cell having an approximately rectangular hysteresis loop, that is, for its transition from one remanent state into the other, in the selected control conductors in $x$- and $y$-direction in each case.

Assume now that the storage cell before the beginning of the writing process is in the "zero" state, i.e., in the one remanent position, then the two "half-currents" flowing in the $x$- and the $y$-conductors cause the storage cells to flip into the "one" state, unless an oppositely directed inhibit current of equal magnitude with the one half-current which flows simultaneously therewith. The read-out of the information contained in selected storage cells takes place as a rule over separate conductors, namely, the sense conductors, at least once each for each storage plane; or more precisely for each information unit "bit" of a word. In the reading process two half-currents again flow in both control conductors, but in the writing process the current flows in the reverse direction. Thereby, all the control storage cells which are situated in the "one" state are caused to flip. This process induces in the sense conductor a signal which is indicative of the fact that the corresponding storage cell has been in the "one" state. If the storage cell, however, was in the "zero" state before the read process, then no flipping occurs, and no corresponding signal is induced in the sense conductor. In any case, however, all the storage cells are in the "zero" state after the read process.

This process just now set forth may, however, be expected only under ideal conditions. In practice, a number of interferences occur within the stores, which if not compensated for would prevent efficient operation of the store. Thus, the conductors running closely parallel to one another cause interferences between one another, both inductively and also capacitively. Furthermore, in all conductors which are linked (in close proximity) with another conductor over one or more storage cells, interference signals are induced in the control conductors as a consequence of imperfectly rectangular hysteresis loop of the cores. The magnitude of the interference signals as well as their harmful effect increases in general more than linearly with the size of the store and inversely with the amount of the storage cycle time.

In the past, it was desirable to construct inhibit conductors within a magnetic store in such a way that interference signals transferred through them to the control conductor or to the sense conductor were reduced.

However, the object of the present invention is to reduce, as far as possible, the interference signals that are normally transferred from the control conductors and the inhibit conductors to the sensee conductors. Even though the inhibit conductors do not operate during the reading process proper, and the sense amplifier is usually scanned, nevertheless the inhibit current contributes an interference to the sense conductor that only dies out gradually and which, unless the first stage of the sense amplifier is already scanned, can lead to a saturation of the read amplifier making it necessary to have a recovery time. The consequence, therefore, is to lengthen the storage cycle time.

As already mentioned, an interference pulse is induced into the sense conductor from each half-amplitude control core connected thereto. A fundamental compensation consists in choosing and opposing orientation of the driver conductors, that is, the active conductors and of the sense conductors in such a way that the interference signals coupled from the half-control storage cells, or magnetic cores, onto the sense conductors compensate themselves as completely as possible. This compensation is provided by having an equal number of half-control storage cells induce interference signals into a sense conductor in one direction and also in the opposite direction. This compensation is achieved, for example, by the well-known diagonal sense conductor orientation. Nevertheless, there always remains a certain inductive coupling and, above all, capacitive coupling. This scatter coupling produces in both ends of the sense conductor a relatively great, rectified interference signals with respect to ground potential, which are transmitted over the storage cells and the inactive conductors from one sense conductor section to another. By reason of the great number of possible paths and their differing lengths, the signals thus transmitted occur at the various sections of the sense conductor in different magnitudes at different times. A differential signal in the form of an attenuated oscillation, which cannot be kept away from the sense amplifier in a similarly simple manner as the interference signal with respect to ground potential, is produced between the two ends of the sense conductor as a result of the sum of the above-mentioned signals.

With the diagonal sense conductor orientation as described, it is not possible to bring about any improvement with respect to the differential signal. More advantageous in this respect is a "rectangular" sense conductor orientation in which the read conductors are arranged so that they start and end at the border of the storage plane in such a way that portions of the sense conductor conduct parallel to other portions of each of said sense conductors in adjacent rows or columns, and in opposite directions. If it is thus necessary to have an intrinsically stronger capacitive coupling of interference signals from control conductors running in a direction parallel to the coordinate direction, nevertheless the capacitive coupling of these interference signals is at all points along the sense conductor at places approximately equally distant from the beginning and the end thereof, and can thereby easily be rendered ineffective since it occurs in like positions at the beginning and at the end of the sense conductors, for example, by means of a differential amplifier. Further, several sense conductors can be oriented within one storage plane in the form of a parallel lamellar thereby the number of storage cells connected with each sense conductor is reduced as well as the length of the driver conductors, which act compactively on the sense conductors.

Several sense conductors per storage plane cause, however, an additional wiring expense, because they must feed their signals as a rule to one and the same sense amplifier, being reciprocally decoupled. An effort is made, therefore, to keep their number as low as possible. This, however, is accomplished through a rectangular read conductor orientation in the form of extended narrow lamellar when the echeloned read pulses are used in the control conductors, i.e., when the half-currents occurring on both control conductors of a controlled core are sequentially spaced in time so that the half-current in the driver conductor which is linked with the sense conductor over the larger number of cores starts first. The sense signal proper, produced by the flipping of a core that is in the "one" state into the "zero" state, is created only by means of the second half-current, which is capable of inducing only relatively slight interferences in the sense conductor due to the fact that there are only a few cores switched simultaneously with a given control conductor and the sense conductor, corresponding to the narrow side of the sense conductor lamellar, in another coordinate direction. This type of magnetic core storage matrix is known in the art. It consists of storage planes which are subdivided into four equal-sized square fields, in which sense conductors are oriented back and forth in each case over two adjacent fields in a meander pattern and cross in the gaps between the fields in each back-and-forth passage. The sense conductors start and end at the same position in the manner described above.

In practice, however, the extended crossings which occur in large numbers in a magnetic core matrix as just described have proved to have an unfavorable effect on the conduction of the sense conductors. A sense conductor, at least, should possess a conduction pattern which is as close to ideal as possible, and should allow any reflected pulses to occur as if reflected from a corresponding real resistance.

A further object of the invention is, therefore, to provide a core storer that overcomes these above-mentioned problems, and also retains all of the essential advantages of the known systems. It is also of importance to provide the feature that each of the conductors begin and end at the border of each storage plane so that these conductors do not have to lead out from the interior of the plane, in twisted form.

Further, according to the invention, a storer operating in accordance with the coincident-current principle with at least one storage plane having magnetic storage cells arranged in rows and columns and connected with at least one control conductor each in a row and one in a column, as well as with an inhibit conductor and a sense conductor, is provided which has each storage plane subdivided into at least two equal-sized, similar fields with each sense conductor oriented substantially parallel to the rows or columns, but perpendicularly to the general direction of the inhibit conductor. The inhibit conductor starts and ends at the same position along the border of the storage plane so that portions of the inhibit conductor which are located equally away from both the beginning and the end have oppositely-directed current flow in adjacent rows or columns. Each sense conductor is oriented in such a manner to be located in two adjacent fields of the storage plane so that it passes over the one field into another in only four places (each crossing has a pair of conductors), and all the conductors of the storage plane begin and end at the border.

Still further according to the invention, each sense conductor in the magnetic store runs in relatively long continuous sections in each case in one of the fields before it passes over into another field. The transition at four positions is necessary in order to satisfy the requirement for a sense conductor to be oriented symmetrically with respect to its beginning and end. Also, it satisfies the requirement for having the conductors terminate at the border of the storage planes.

Other objects, advantages and features will become more apparent with the teaching of the principles of the present invention in connection with the disclosure of the preferred embodiments thereof in the specification, claims and drawing in which the figure is a schematic diagram of a magnetic storer embodying principles of the present invention.

As shown in the drawing:

Referring now to the drawing, the dot-and-dash boundary line 1 designates the boundary of the storage plane. Magnetic cores 2 are arranged within the storage plane, schematically indicated as short oblique lines, in rows and columns in the two fields 3 and 4 of the storage plane 1. The number of storage cells or cores 2, at least in the rows, is a number divisible by four in each field for providing the needed compensation in accordance with the principles of the invention. The number of cores in each column is made equal, ordinarily, to the number of cores in each row; in any case, they must be divisible by two because of the nature of the sense conductor orientation as shown in the drawing. Each core 2 is to be considered as located at the crossing point of a control conductor $x$ in a row and of a control conductor $y$ in a column, for each core. For the sake of clarity, however, the control conductors themselves were not illustrated in the drawing. At the left and upper edge of the drawing, however, the particular current direction in the control conductors is illustrated under the parentheses, by arrows, for example for the writing process. Two inhibit conductors 5 and 6 are present in each one of the fields 4 and 3 respectively in the storage plane 1. The inhibit conductors are connected substantially parallel to the $y$-conductors so that portions of the inhibit conductors which are located at substantially equal distance away from their terminals 7 and 8, and 9 and 10, respectively, have oppositely-directed current through adjacent columns. As a result, compensation of the interference signals coupled in from the border portions 11 into the sense conductors, even when, as in the case shown in the drawing, both borders run beside different sense conductors, 12 and 13. If, therefore, the inhibit conductors were not oriented to have the beginning and end thereof return to the same position in the manner shown, then the interference signals coupled from the border portions 11 would provide compensation only if the two oppositely situated borders were adjacent to one and the same sense conductor in the same manner.

In the example shown in the drawing, two sense conductors 12 and 13 are oriented in accordance with the principles of the present invention in the form of a lamellar extending parallel to the $x$-control conductor over the two fields 3 and 4 so that portions equally remote from their terminals 14, 15 and 16, 17, respectively, run oppositely to one another in adjacent rows. Thereby, as already stated, interference coupled in at any place on the storage plane 1 onto one of the sense conductors, which comes from one of the inhibit conductors 5 or 6 or one of the $y$-control conductors, have the same polarity at the two terminals 14 and 15 or 16 and 17 of the sense conductors 12 and 13, and thus are readily cancelled.

Each of the two sense conductors 12 and 13 extend over relatively long sections, i.e. through several adjacently situated rows, in each case within one of the fields 3 and 4. Each sense conductor changes fields at only four places.

It crosses itself in the process for reasons of electrical symmetry. Therefore, elongated crossings 18 result, having two for each sense conductor.

In the example shown in the drawing, in which field 3 as well as 4 has only sixteen times sixteen cores, the savings in elongated crossings 18 is not very apparent as compared to the known arrangements mentioned above. If, however, it is considered that in practice each field has, for example, sixty-four times sixty-four cores without having an increase in the number of crossings 18, then the savings and the corresponding electrical improvement becomes clear. A design having only one crossing 18 for each sense conductor is conceivable in and of itself. Such an arrangement would have, however, the drawback that the sense conductor terminals would be located in the center of the plane, i.e. in the gap between the fields; assuming good electrical symmetry relationships for the sense conductors. However, this would be especially disadvantageous if, for example, a square storage plane would be formed having four fields of the type shown in the drawing. This type of an arrangement would require that the sense conductor terminals would necessarily have to be led out from the interior portion of the storage plane in twisted form, and therefore, would have a disadvantageous effect upon the behavior of the conductors. The storage plane according to the invention illustrated in the drawing, on the other hand, can be extended without difficulty to an arrangement having four fields, in which all of the terminals would be nevertheless located directly on the border of the plane.

Since such a storage plane consists essentially of an array of storage planes of the type as shown, the individual parts, with corresponding control means provided, can be used for the storage of two information units that are independent of one another, as if there were actually two separate storage planes.

This arrangement is advantageous for constructional reasons, because square storage planes require the least wiring expenditure and the least conductor length per storage unit. Furthermore, the same storage planes are useable for storers of different storage capacity, for example, both for a storer with 16384 words and also for one with 8192 words.

The drawing and specification present a detailed disclosure of the preferred embodiment of the invention, and it is to be understood that the invention is not limited to the specific form disclosed, but covers all modifications, changes and alternative constructions and methods falling within the scope of the principles taught by the invention.

I claim:

1. A storer operating according to the coincident-current principle having at least one storage plane, said storage plane having a plurality of magnetic storage cells arranged in rows and columns, each of said storage cells connected with at least one row conductor, one column conductor, an inhibit conductor, and a sense conductor, said storer comprising:

each storage plane subdivided into a plurality of equal-sized like-shaped fields, each of said fields having at least one sense conductor oriented substantially parallel to said rows or columns and perpendicular to the general direction of said inhibit conductor having the beginning and the end thereof at the same position so that portions thereof that are equally far remote from the beginning and the end thereof have oppositely-directed current in adjacent rows or columns;

said sense conductors oriented to extend through two adjacent fields of said storage plane to provide only four two-conductor crossings in the gap between two of said fields; and each of said conductors of the storage plane begin and end directly on the border of said plane.

2. A storer according to claim 1, wherein said sense conductors are oriented to be located next to one another in lamellar form.

3. A storer according to claim 1, further includes a plurality of parallel storage planes, each storage plane having substantially the same number of storage cells in each row and each column, each row and column having a common conductor with like orientation, and each storage plane having only one sense conductor, said sense conductor and said inhibit conductors oriented to change direction by a right angle from storage plane to storage plane.

4. A storer according to claim 2, wherein each storage plane consists of a plurality of parts, for storing separate information units independently of one another under like addresses.

References Cited

UNITED STATES PATENTS

| | | | |
|---|---|---|---|
| 3,155,942 | 11/1964 | Hoover | 340—174 |
| 3,161,860 | 12/1964 | Grooteboer | 340—174 |
| 3,208,053 | 9/1965 | Elovic | 340—174 |
| 3,339,186 | 8/1967 | Cohen | 340—174 |

OTHER REFERENCES

Publication I: IBM Technical Disclosure Bulletin, "Crossover Balanced Inhibit Segments," by Councill et al. vol. 6, No. 4, September 1963, pp. 55 and 56.

STANLEY M. URYNOWICZ, Jr., *Primary Examiner.*